(12) United States Patent
Hosking

(10) Patent No.: US 8,204,773 B2
(45) Date of Patent: Jun. 19, 2012

(54) RANGE FORECASTING OF DEMAND FOR ORDER CONFIGURATIONS FOR CONFIGURABLE PRODUCTS

(75) Inventor: Jonathan R. Hosking, Scarsdale, NY (US)

(73) Assignee: International Business Machines Corporation, Armonk, NY (US)

( * ) Notice: Subject to any disclaimer, the term of this patent is extended or adjusted under 35 U.S.C. 154(b) by 1219 days.

(21) Appl. No.: 11/950,161

(22) Filed: Dec. 4, 2007

(65) Prior Publication Data

US 2009/0144126 A1     Jun. 4, 2009

(51) Int. Cl.
    G06Q 10/00     (2006.01)
(52) U.S. Cl. .................................. 705/7.25; 705/7.31
(58) Field of Classification Search ............... 705/7.25, 705/7.31
    See application file for complete search history.

(56) References Cited

U.S. PATENT DOCUMENTS

| | | | | |
|---|---|---|---|---|
| 7,149,739 | B1 * | 12/2006 | Dose et al. | 1/1 |
| 2003/0229550 | A1 * | 12/2003 | DiPrima et al. | 705/28 |
| 2007/0010904 | A1 * | 1/2007 | Cheng et al. | 700/97 |

OTHER PUBLICATIONS

Hosking, et al "Beyond the lognormal", Risk, May 2000.*
Research Report Multiplicative Adjustment of Class Probability: Se June Hong, Jonathan Hosking, Ramesh Natarajan, "Multiplicative Adjustment of Class Probability: Educating Naïve Bayes", IBM Research Division, T. J. Watson Research Center, Yorktown Heights, Ny 10598 Apr. 2002.*
J.R.M. Hosking "Some theory and practical uses of trimmed L-moments", Journal of Statistical Planning and Inference 137 (2007) 3024-3039.*
Hosking, et al "Beyond the lognormal", Risk, May 2000.*
Gebhardt, Klose, Detmer, Rugheimer and Kruse, 2006, "Graphical Models for Industrial Planning on Complex Domains", downloaded from http://citeseerx.ist.psu.edu/viewdoc/summary?doi=10.1.1.91.3658 on Jan. 8, 2012.*
Gebhardt et al., Predicting Parts Demand in the Automotive Industry—An Application of Probabilistic Graphical ModelS, 2003, In Uncertainty in Artificial Intelligence: Proceedings of the 19th Conference (UAI-2003).*
Gebhardt et al., Graphical Models for Industrial Planning on Complex Domains, in: Decision Theory and Multi-Agent Planning, pp. 131-143, Springer, 2006.
The Method of Moments, Copyright 1997-2011, http://www.math.uah.edu/stat/point/Moments.xhtml.
Myung, Tutorial on maximum likelihood estimation, Journal of Mathematical Psychology 47 (2003) 90-100.
Gebhardt et al., Adaptable Markov Models in Industrial Planning, Fuzzy Systems, 2004. Proceedings. 2004 IEEE International Conference.

* cited by examiner

*Primary Examiner* — Mark Fleischer
(74) *Attorney, Agent, or Firm* — Scully, Scott, Murphy & Presser, P.C.; Daniel P. Morris, Esq.

(57) ABSTRACT

A method and system for forecasting demand for order configurations are provided. The method and system, in one aspect, expresses attach rates within a family of n options as a set of n positive numbers that sum to 1. By applying suitable transformations to the attach rates, they are modeled as a random vector in (n−1)-dimensional Euclidean space. The distribution of the transformed attach rates are modeled as a distribution family specified by a location vector and a dispersion matrix. The dispersion matrix is simplified, for example, using historical data or expert judgment or both to identify option families that have dependent demand. Simplifying may also include expressing dependence between options by a simple model that involves few parameters. Location vector is estimated by computing point forecasts of transformed attach rates. The parameters of the dispersion matrix are estimated by calibration on historical data, using the dispersion of the errors in historical point forecasts.

16 Claims, 5 Drawing Sheets

RANGE FORECASTING OF DEMAND FOR ORDER CONFIGURATIONS FOR CONFIGURABLE PRODUCTS

FIELD OF THE MENTION

The present disclosure relates to supply planning, and more particularly to a method and system for range forecasting.

BACKGROUND OF THE INVENTION

Effective supply chain planning for a product requires not only forecasting future demands but also modeling the uncertainty in future demand. Capacity planning methods such as stochastic optimization based on the sample average approximation, involve generating scenarios for future demands simultaneously for many components. This requires that demand forecasts be supplied as predictive distributions, or "range forecasts"; traditional single-valued forecasts, or "point forecasts", are insufficient for scenario generation.

Many products can be configured with various options when purchasing. For example, customers may request or attach optional configurations on equipment that they are purchasing. Attention then focuses on forecasting the attach rates (the proportion of the product for which a particular option is requested) for each option. Various options that can be attached may be structured in a hierarchical framework. In such a hierarchical framework forecasts may be required for thousands of option attach rates simultaneously. Estimating and using a predictive distribution in its full generality, permitting all possible dependencies between different options, is a computationally intractable problem.

Known solutions to the problem make forecasts for attach rates individually or a few at a time, and combine them into a predictive distribution by assuming independence between the separately forecast attach rates. This approach is unable to capture any but the simplest of dependences between demand for different options, and risks making systematically inaccurate judgments of future capacity requirements.

BRIEF SUMMARY OF THE INVENTION

A method and system for forecasting demand for order configurations are provided. In one aspect, the method may comprise expressing attach rates associated with n options as a set of n positive numbers whose sum is one. An attach rate represents a proportion of a product for which an option is requested. The method may also include transforming said attach rates as a random vector in n−1 dimensional Euclidean space and modeling a distribution of the transformed attach rates. The method may further include estimating a location vector of the distribution by computing point forecasts of the transformed attach rates and estimating a dispersion matrix of the distribution. The dispersion matrix describes variability of forecast errors of the transformed attach rates. The method also may include transforming said location vector and said dispersion matrix to forecast attach rates.

A system for forecasting demand for order configurations, in one aspect, may comprise means for expressing attach rates associated with n options as a set of n positive numbers whose sum is one. An attach rate represents a proportion of a product for which an option is requested. The system may also include means for transforming said attach rates as a random vector in n−1 dimensional Euclidean space, means for modeling a distribution of the transformed attach rates. The system may further include means for estimating a location vector of the distribution by computing point forecasts of the transformed attach rates and means for estimating a dispersion matrix of the distribution. The dispersion matrix describes variability of forecast errors of the transformed attach rates. The system may also include means for transforming said location vector and said dispersion matrix to forecast attach rates.

A program storage device readable by a machine, tangibly embodying a program of instructions executable by the machine to perform the above method steps may be also provided.

Further features as well as the structure and operation of various embodiments are described in detail below with reference to the accompanying drawings. In the drawings, like reference numbers indicate identical or functionally similar elements.

DETAILED DESCRIPTION

Present disclosure describes a practical method of computing predictive distributions for large numbers of option attach rates. In an embodiment, a method is provided that simplifies the predictive distribution of attach rates while maintaining reasonable fidelity to the actual dependence as measured by calibration on historical data.

Figure 1:
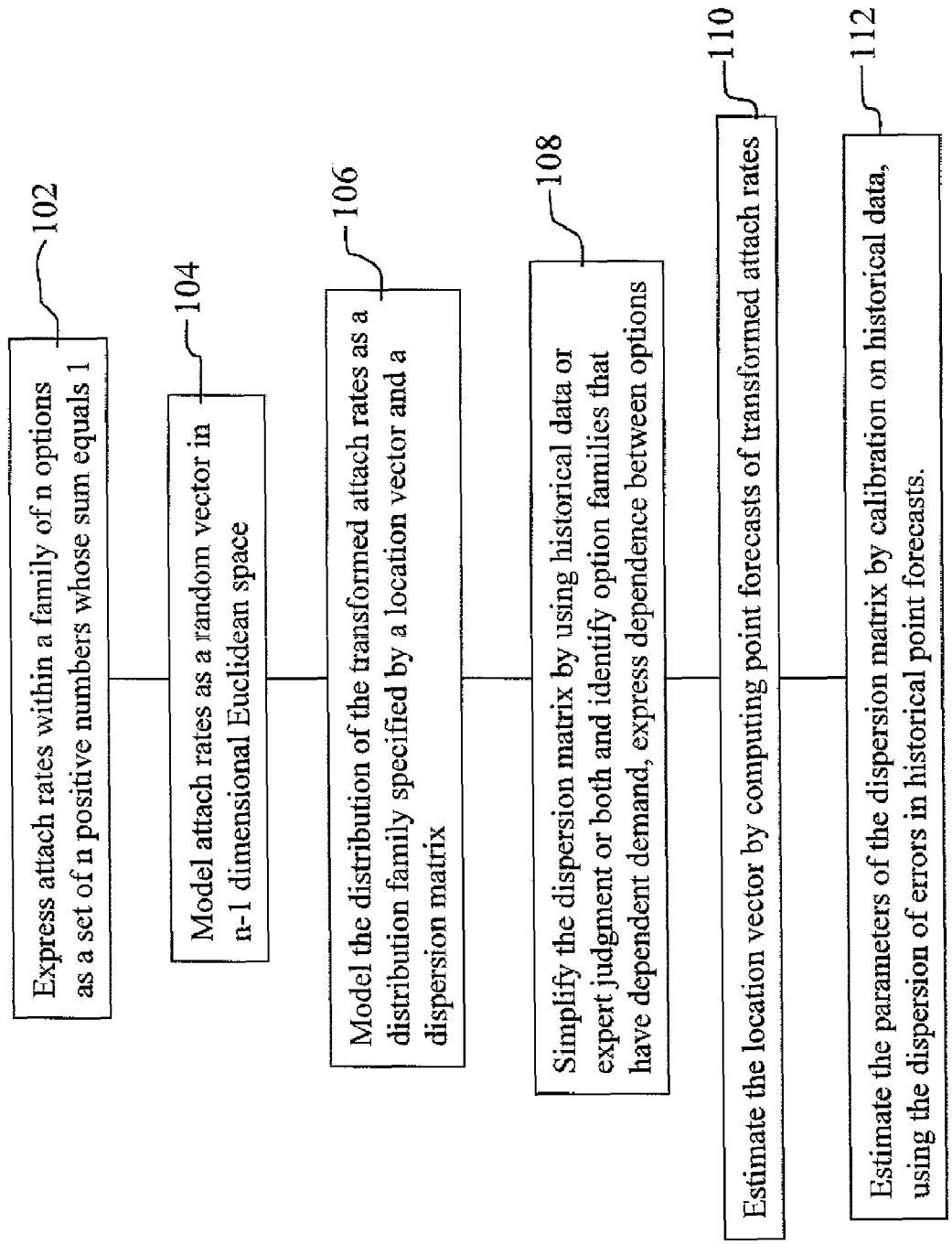
FIG. 1 illustrates a method of the present disclosure in one embodiment.

FIG. 1 illustrates a method of the present disclosure in one embodiment. At 102, the method expresses attach rates within a family of n options as a set of n positive numbers that sum to 1. At 104, by applying suitable transformations to the attach rates, they are modeled as a random vector in (n−1)-dimensional Euclidean space. At 106, the method includes modeling the distribution of the transformed attach rates as a distribution family specified by a location vector and a dispersion matrix. At 108, the dispersion matrix is simplified. Simplifying in one embodiment includes using historical data or expert judgment or both to identify option families that have dependent demand. Simplifying may also include expressing dependence between options by a simple model that involves few parameters. An exemplary embodiment of the method may implement practical judgments on the magnitudes of different categories of dependence. At 110, the method includes estimating the location vector by computing point forecasts of transformed attach rates. At 112, the parameters of the dispersion matrix are estimated by calibration on historical data, using the dispersion of the errors in historical point forecasts.

The method of the present disclosure may provide substantial guarantee that the estimated attach rates will lie in their permissible range, between 0 and 1, and is computationally practical for computing a predictive distribution for many attach rates. At the same time, reasonable fidelity to the true dependence structure of the distribution can be maintained. It is also a convenient method for generating random scenarios of future demand.

An example application for the method of the present application includes an ordering system in which there is a structure of options for selection. Assume each option in the structure is a member of exactly one option class, and within each option class the customer selects exactly one option to accommodate options that may be chosen or not chosen, an option may be designated as indicating that the customer chose none of the other options in the option class. For example, in an automobile purchase scenario, the option class "sunroof" may have the options "sunroof" and "no sunroof".

Figure 2:
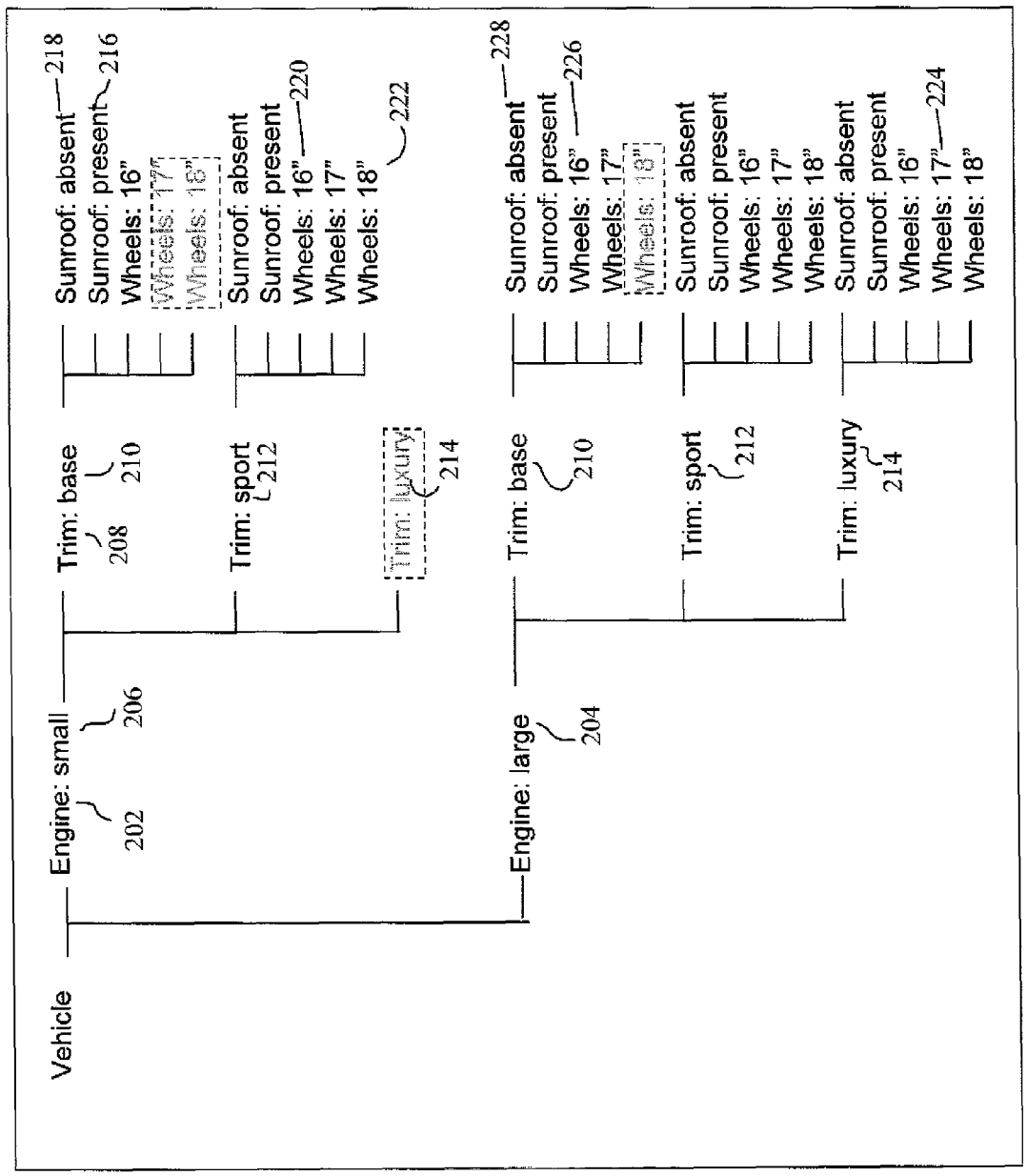
FIG. 2 illustrates an example of various options available on an automobile shown in a hierarchical structural form.

A method of the present disclosure may be used to forecast attach rates for a set of subproducts. In one embodiment, the set of subproducts which can be attached as options may be arranged in a hierarchy, with each option class being present at one level of the hierarchy. Many options may appear at the lowest level of the hierarchy. An option class may appear in multiple places at one level of the hierarchy; in such cases attach rates for options in this class are to be forecast separately for each product configuration to which the option class is linked at the next higher level of the hierarchy An example of such a hierarchy for an automotive product is illustrated in FIG. 2. FIG. 2 shows the following set of options. In the option class "Engine" 202, a customer may select a large engine 204 or a small engine 206. Trim level option 208 may be base 210, sport 212, or luxury 214. Luxury option may be available only with "large" engine, as shown by the dotted box enclosing that option. Options for sunroof may be present 216 or absent 218. Options on wheels may further include different sizes—16" (220), 17" (224), or 18" (222). For the base trim level, with the small engine only wheel size 16" is available and with the large engine only wheel sizes 16" and 17" are available. Given such data hierarchy or structure of options in ordering a product or service or like, the method of the present disclosure can estimate the following attach rates: each engine, as a proportion of total sales of the vehicle; each trim level, separately for each engine size; each sunroof choice, separately for each combination of engine size and trim level; each wheel size, separately for each combination of engine size and trim level.

Figure 3:
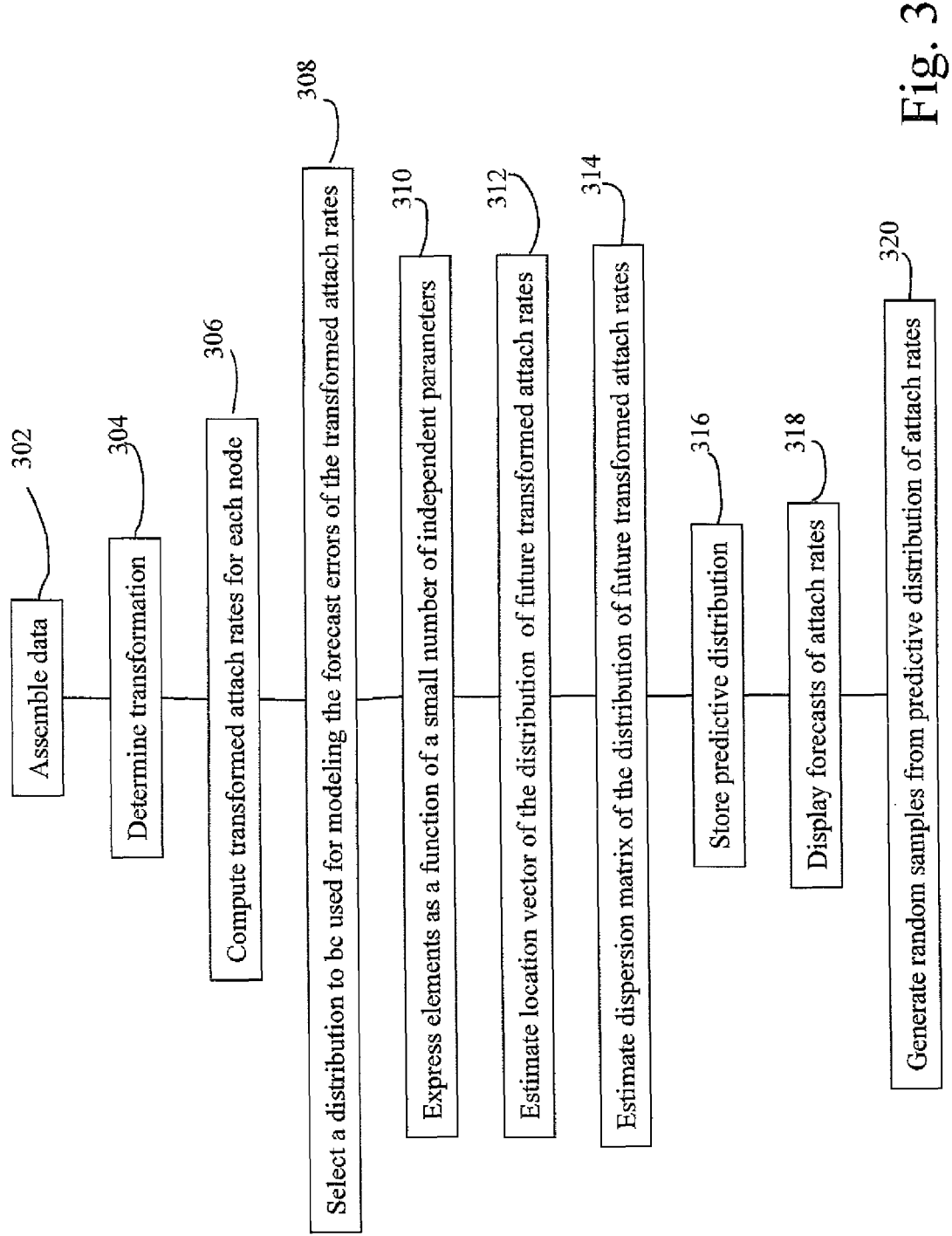
FIG. 3 illustrates a forecasting method in one embodiment of the present disclosure for an automobile order example shown in FIG. 2.

FIG. 3 illustrates a forecasting method of the present disclosure for the above given example scenario in one embodiment. At 302, a set of data from which forecasts can be made is assembled. This typically may be historical data on option attach rates over regular time intervals (e.g. week, month, or quarter). If forecasts are required for k time units ahead, data points as far back as h time units in the past area may be needed in order to compute these forecasts at step 312, and m values of the forecast error are used for efficient estimation of entries of the dispersion matrix in step 314. Data thus should extend at least k+h+m time units into the past. This is because to compute the dispersion matrix elements, the method requires m forecast errors, and, a fortiori, requires a forecast error from (at least as far in the past as) m time units ago; to compute this forecast error for a k-step-ahead forecast requires the forecast that was made m+k time units ago; and to compute this forecast requires data from m+k+h time units ago.

At 304, a suitable transformation of the attach rates is determined. The attach rates for an option class containing n options can be expressed as a set of n numbers $a_1 \ldots, a_n$ lying between 0 and 1 inclusive and summing to 1. A mathematical transformation is applied to the attach rates: n values subject to one constraint are replaced by a set of n−1 values that are unconstrained and can be modeled as a random vector in (n−1)-dimensional Euclidean space. In one exemplary embodiment the attach rates $a_1 \ldots, a_n$ are transformed to a set of n−1 "transformed attach rates" $c_1 \ldots, c_{n-1}$ defined by:

$$c_i = \log(a_i) - n^{-1} \sum_{j=1}^{n} \log(a_j), \quad (1)$$

$$i = 1, \ldots, n-1.$$

In practice exact zero values of attach rates are possible and to avoid mathematical difficulties a modified definition may be used:

$$c_i = \log(a_i + \varepsilon) - n^{-1} \sum_{j=1}^{n} \log(a_j + \varepsilon), \quad (2)$$

$$i = 1, \ldots, n-1,$$

where $\varepsilon$ is a small positive number, for example 0.01.

At 306, for each node of the hierarchy, the transformed attached rates are computed as defined in step 304. At any node, option classes all of whose rates are structurally known to be 0 or 1 may be omitted, since they can be forecast with certainty. For example, in FIG. 2, the class "Wheels" at the nodes "Engine: small, Trim level: base" and "Engine: large, Trim level: base" falls into this category since "base" trim level permits only 16" wheels. Thus, in that example, the attach rates for options in the "Wheels" class are known to be 1, 0, 0 for wheel sizes 16", 17" and 18", respectively.

At 308, a distribution to be used for modeling the forecast errors of the transformed attach rates is selected. The distribution of future transformed attach rates, overall option families and all nodes of the hierarchy, should be modeled by a distribution specified by a location vector and a dispersion matrix, and optionally a small number of additional parameters that may, for example, describe the skewness of the distribution. In one exemplary embodiment it is a multivariate normal distribution.

At 310, the structure of each of its elements is expressed as a function of a small number of independent parameters, as opposed to the total number of elements in the matrix. The dispersion matrix describes the variability of the forecast errors of transformed attach rates. Its structure needs to be simple enough to enable the computations at steps 314 and 318 to be practical, yet complex enough to capture important dependencies between fluctuations in demand for different options.

The following categories of dependence may be recognized: (a) between options in the same class at a single node of the hierarchy, for example, dependence between items 216 and 218 shown in FIG. 2; (b) between options in different classes at a single node of the hierarchy, for example, dependence between items 226 and 228 shown in FIG. 2; (c) between the same option at different nodes of the hierarchy, for example, dependence between items 220 and 226 shown in FIG. 2; (d) between options in the same class at different nodes of the hierarchy, for example, dependence between items 222 and 226 shown in FIG. 2; (e) between options from different classes at different nodes of the hierarchy, for example, dependence between items 216 and 224 shown in FIG. 2.

Table 1 shows the structure of the dependence matrix that corresponds to the hierarchy in FIG. 2. The "Sunroof" option has two possible values, "present" and "absent", and therefore, yields one transformed attach rate, which is denoted by S. The "Wheels" option has either one, two, or three possible values, depending on which of the five engine-trim combinations the option is linked, which yield respectively, no transformed attach rate, one transformed attach rate (denoted by W*), or two transformed attach rates (denoted by $W_1$ and $W_2$). In all there are twelve transformed attach rates across the five lowest-level nodes of the hierarchy; they are indicated in Table 1 by the combination of types of engine (S denoting Small, L denoting Large), trim (B denoting Base, S denoting Sport, L denoting Luxury) and option (denoted by S, $W_1$, $W_2$, and W*, as indicated above). Off-diagonal elements of the matrix are measures of dependence between forecast errors of the various transformed attach rates: the entries in the matrix 'a', 'b', 'c', 'd', and 'e' correspond to the five types of dependence described above. These entries are shown only for elements lying above the main diagonal of the matrix: entries below the main diagonal can be derived from those above the main diagonal, because the matrix is symmetric.

TABLE 1

Dispersion matrix of forecast errors corresponding to the hierarchy illustrated in FIG. 2.

| Engine | S | S | S | S | L | L | L | L | L | L | L | L | | | |
|---|---|---|---|---|---|---|---|---|---|---|---|---|---|---|---|
| Trim | B | S | S | S | B | B | S | S | S | L | L | L | Option | Trim | Engine |
| Option | S | S | $W_1$ | $W_2$ | S | W* | S | $W_1$ | $W_2$ | S | $W_1$ | $W_2$ | | | |
| | | c | e | e | c | e | c | e | e | c | e | e | S | B | S |
| | | | b | b | c | e | c | e | e | c | e | e | S | S | S |
| | | | | a | e | d | e | c | d | e | c | d | $W_1$ | S | S |
| | | | | | e | d | e | d | c | e | d | c | $W_2$ | S | S |
| | | | | | | b | c | e | e | c | e | e | S | B | L |
| | | | | | | | e | d | d | e | d | d | W* | B | L |
| | | | | | | | | b | b | c | e | e | S | S | L |
| | | | | | | | | | a | e | c | d | $W_1$ | S | L |
| | | | | | | | | | | e | d | c | $W_2$ | S | L |
| | | | | | | | | | | | b | b | S | L | L |
| | | | | | | | | | | | | a | $W_1$ | L | L |
| | | | | | | | | | | | | | $W_2$ | L | L |

TABLE 2

A possible simplified form of a correlation matrix corresponding to the dispersion matrix in Table 1.

| Engine | S | S | S | S | L | L | L | L | L | L | L | L | | | |
|---|---|---|---|---|---|---|---|---|---|---|---|---|---|---|---|
| Trim | B | S | S | S | B | B | S | S | S | L | L | L | Option | Trim | Engine |
| Option | S | S | $W_1$ | $W_2$ | S | W* | S | $W_1$ | $W_2$ | S | $W_1$ | $W_2$ | | | |
| | 1 | | 0 | 0 | | 0 | | 0 | 0 | | 0 | 0 | S | B | S |
| | $c_1$ | 1 | $b_1$ | $b_2$ | | 0 | | 0 | 0 | | 0 | 0 | S | S | S |
| | 0 | $b_1$ | 1 | $a_1$ | 0 | 0 | 0 | $c_4$ | 0 | 0 | $c_4$ | 0 | $W_1$ | S | S |
| | 0 | $b_2$ | $a_1$ | 1 | 0 | 0 | 0 | 0 | $c_5$ | 0 | 0 | $c_5$ | $W_2$ | S | S |
| | $c_3$ | $c_3$ | 0 | 0 | 1 | $b_3$ | | 0 | 0 | | 0 | 0 | S | B | L |
| | 0 | 0 | 0 | 0 | $b_3$ | 1 | 0 | 0 | 0 | 0 | 0 | 0 | W* | B | L |
| | $c_3$ | $c_3$ | 0 | 0 | $c_2$ | 0 | 1 | $b_1$ | $b_2$ | | 0 | 0 | S | S | L |
| | 0 | 0 | $c_4$ | 0 | 0 | 0 | $b_1$ | 1 | $a_2$ | 0 | $c_4$ | 0 | $W_1$ | S | L |
| | 0 | 0 | 0 | $c_5$ | 0 | 0 | $b_2$ | $a_2$ | 1 | 0 | 0 | $c_5$ | $W_2$ | S | L |
| | $c_3$ | $c_3$ | 0 | 0 | $c_2$ | 0 | $c_2$ | 0 | 0 | 1 | $b_1$ | $b_2$ | S | L | L |
| | 0 | 0 | $c_4$ | 0 | 0 | 0 | 0 | $c_4$ | 0 | $b_1$ | 1 | $a_2$ | $W_1$ | L | L |
| | 0 | 0 | 0 | $c_5$ | 0 | 0 | 0 | 0 | $c_5$ | $b_2$ | $a_1$ | 1 | $W_2$ | L | L |

An exemplary embodiment in the present disclosure specifies the structure of the dispersion matrix by applying the following assertions, which are based on general experience and/or knowledge with hierarchically structured option data. The result is a simplified structure for the dispersion matrix. An example of such a simplified structure is illustrated in Table 2 which corresponds to the option hierarchy in FIG. 2 and displays a simplification of the dependencies of Table 1 in the form of a correlation matrix for forecast errors of transformed attach rates. Details of how this simplified form was obtained are given in the following paragraphs.

Dependencies in class (a) are frequently large and can vary across the nodes of the hierarchy. Each dependency in this class could be modeled by a single parameter. If the variation across nodes is deemed to be small, the dependency between a given pair of options can be constrained to be equal across all nodes, and modeled by a single parameter. Intermediate degrees of variation are also possible. For example, in the hierarchy of FIG. 2, there are three dependencies between transformed attach rates in the same option class, in each case the "Wheels" class. They correspond to the three matrix elements indicated by "a" in Table 1. These may be set equal to one value $a_1$ for nodes that correspond to "Engine size: small" and to another value $a_2$ for nodes that correspond to "Engine size: large". Thus the three values indicated by a in the matrix in Table 1 become the values $a_1$ and $a_2$ that appear in the corresponding locations in the matrix in Table 2.

Dependencies in class (b) can be assessed at the level of option classes: if two option classes are deemed to be dependent, then a dependence parameter is included for every pair of transformed attach rates that contains one member from each of the two option classes; if two option classes are deemed to be independent, then the dispersion matrix has entries that reflect independence between every pair of transformed attach rates that contains one member from each of the two option classes. In one embodiment, dependence between option classes is assessed by expert judgment or by analysis of historical data. Typically only a few pairs of option classes are deemed to be dependent. Further simplification of these dependencies, for example by setting their magnitudes to be equal for the same pair of transformed attach rates at each node, can be made, if justified by expert judgment or by analysis of historical data. In the example dispersion matrix in Table 1, it is assumed that there is dependence between the two option classes "Sunroof" and "Wheels", and that each combination of attach rates has the same amount of dependence over all nodes of the hierarchy (engine-trim combinations). The distinct dependencies are between pairs of transformed attach rates S and $W_1$, S and $W_2$, and S and W*, and are set equal to the three values $b_1$, $b_2$, and $b_3$, respectively in the simplified dispersion matrix in Table 2.

Dependencies in class (c) are typically present, but it may be inefficient to estimate them all separately. They can be set to have equal magnitude, or they can be modeled as a function of a small number of characteristics of the nodes. For example, in FIG. 2 the option class "Sunroof" has two options and therefore one transformed attach rate, and it occurs at five nodes of the hierarchy, resulting in $$\binom{5}{2},$$

i.e. ten, distinct dispersion matrix elements that represent dependence between forecast errors for the transformed attach rates of the "Sunroof" option class at different engine-trim combinations. The values of these ten dispersion matrix elements could be modeled in terms of the "Engine" option class at each node, by being constrained to take one value $c_1$ for pairs of nodes each with "Engine: small", a second value $c_2$ for pairs of nodes each with "Engine: large", and a third value $c_3$ for pairs of nodes corresponding to different engine sizes; the ten matrix elements would thereby be modeled by only three distinct values. This is illustrated in Table 2. The relevant matrix elements are shaded, and contain the values $c_1$, $c_2$, and $c_3$, as described above. The other elements in the matrix in Table 1 that correspond to category (c) dependence are for transformed attach rates $W_1$ and $W_2$ in the "Wheels" option class. In Table 2 they have been set to equal values across all nodes, taking the values $c_4$ for dependences between attach rates $W_1$ at different engine-trim combinations and $c_5$ for dependences between attach rates $W_2$ at different engine-trim combinations.

Dependencies in categories (d) and (e) tend to be small, and can be, to a good approximation, set to zero. This has been done for the relevant elements of the matrix in Table 2.

Table 2 illustrates the form of the correlation matrix arising from the simplifications described above. The 66 distinct dependencies, corresponding to the off-diagonal elements of the matrix in Table 1, are now modeled by the 10 distinct values $a_1$, $a_2$, $b_1$, $b_2$, $b_3$, $c_1$, $c_2$, $c_3$, $c_4$, and $c_5$. It is reasonable to expect that these 10 values can be estimated from historical data with much greater accuracy than could the 66 values of the original matrix.

At 312, the location vector of the distribution of future transformed attach rates is estimated. The location vector includes point forecasts of the transformed attach rates. The forecasts may be computed by any forecasting method, known or will be known. Transformed attach rates may be forecast separately, using univariate methods such as exponential smoothing. Alternatively, groups of transformed attach rates may be forecast simultaneously using multivariate methods. For example, the transformed attach rates for an option class at a node could be forecast using a multivariate autoregressive moving-average model.

Figure 4:
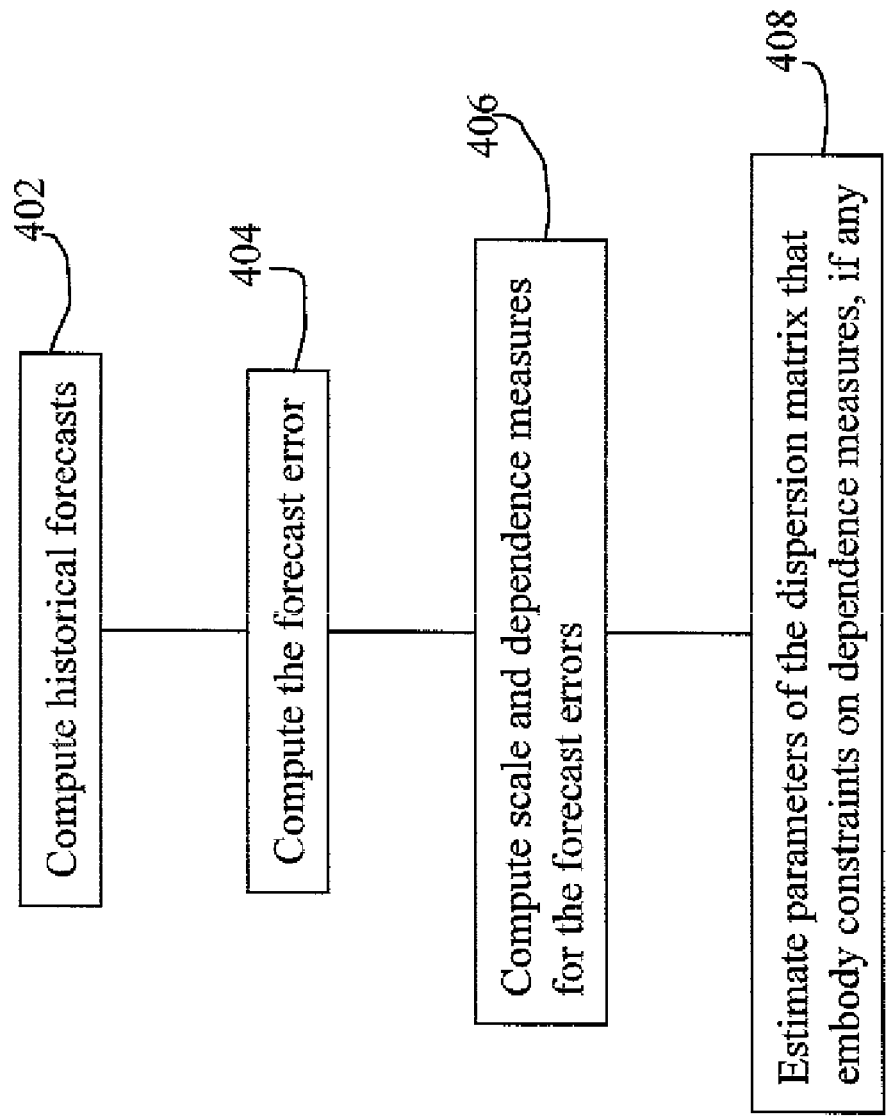
FIG. 4 illustrates the steps of estimating the dispersion matrix in one embodiment.

At 314, the dispersion matrix of the distribution of future transformed attach rates is estimated. An example of the form of such a matrix is given in Table 2. Elements of the dispersion matrix are estimated from scale and dependence measures (e.g., variances and covariances) of forecast errors from historical forecasts. FIG. 4 illustrates the steps of estimating the dispersion matrix in one embodiment. Assume without loss of generality that forecasts are made for k time units in the future; let m be a number such that dependence measures can be estimated with adequate accuracy from m data points. Referring to FIG. 4, at 402, historical forecasts are computed, for example, as in step 312, but for historical data. The forecasts are computed (or extracted from a database in which they were stored at a previous iteration of this procedure) that would have been made k, k+1, . . . , k+m−1 time steps ago. At 404, computations are made for the forecast errors, the differences between actual and forecast values of the transformed attach rates, for the forecasts computed at step 402.

At 406, the method includes computing scale and dependence measures for the forecast errors computed at step 404. For example, if the dependence measures are covariances, the computations involve computing sample covariances, each based on m pairs of forecast errors for pairs of transformed attach rates. Dependence measures need not be computed for pairs of transformed attach rates that, according to the model specification in Step 308 of FIG. 3, have no dependence.

At 408, where there are constraints on dependence measures, the parameters of the dispersion matrix that embody these constraints are estimated. Estimation can be done by any known or will be known method. An exemplary embodiment uses the method of least squares. For example, if a set of elements of the dependence matrix are constrained to be equal, least-squares estimation sets them all equal to the mean of the corresponding dispersion measures computed at step 406.

Referring back to FIG. 3, at 316, the predictive distribution is stored in any convenient form that permits further computation. For example, the estimated location vector and parameters of the dispersion matrix may be stored in computer files.

At 318, the method optionally may further involve displaying the results in a form suitable for interpretation by the user or users of the forecasts. Users may typically need forecasts of attach rates, not transformed attach rates, so any point values of transformed attach rates $c_i$ will need to be transformed back to the original attach rates $a_i$. For example, the reverse transformation corresponding to (1) is $$a_i = \exp(c_i) \bigg/ \sum_{j=1}^{n} \exp(c_j), \qquad (3)$$

$$i = 1, \ldots, n,$$

where $c_n$ is given by (1) with in, and the reverse transformation corresponding to (2) is $$a_i = (1 + n\varepsilon)\exp(c_i) \bigg/ \sum_{j=1}^{n} \exp(c_j) - \varepsilon, \qquad (4)$$

$$i = 1, \ldots, n,$$

where $c_n$ is given by (2) with i=n.

Figure 5:
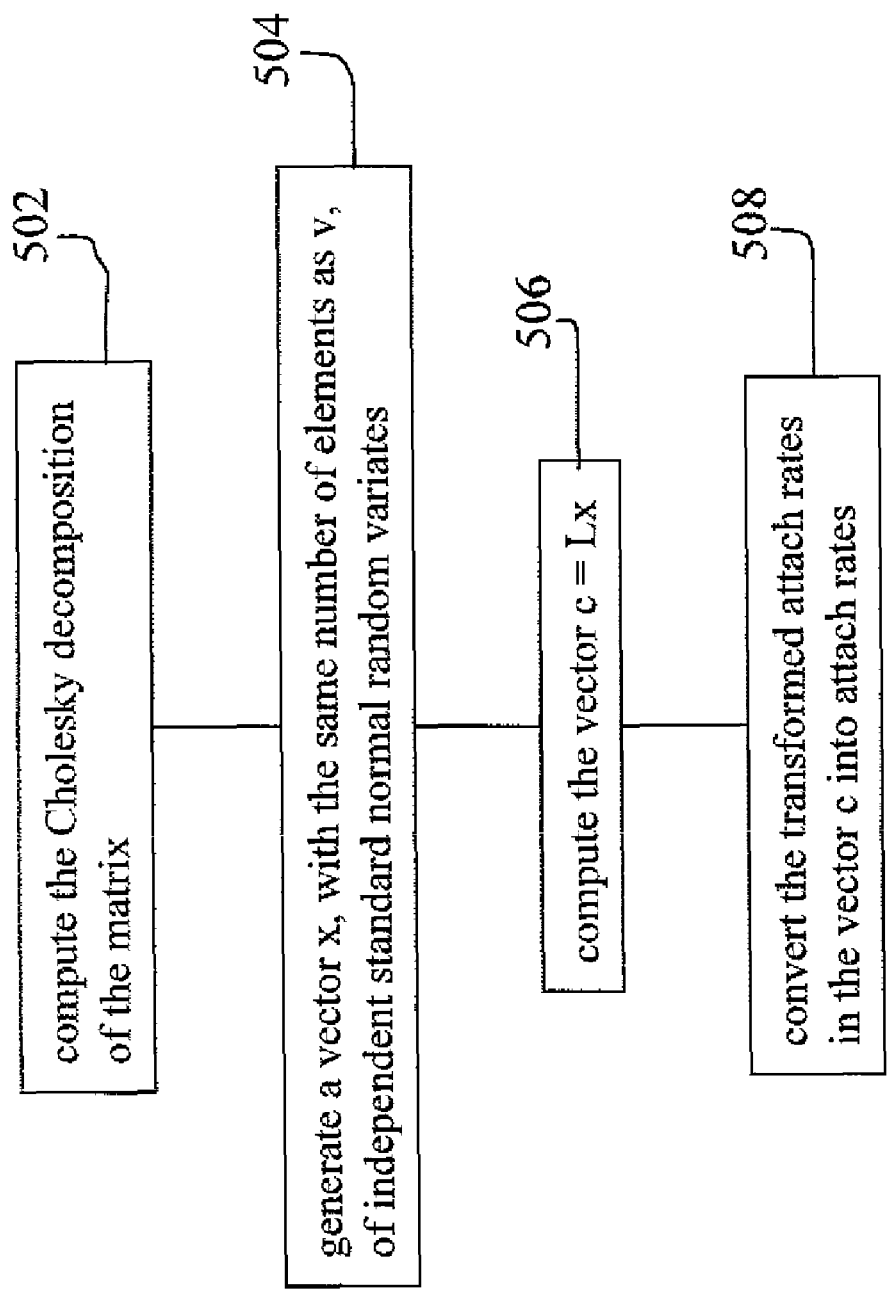
FIG. 5 illustrates a procedure in one embodiment for generating a random realization of the predictive distribution of attach rates.

Optionally, at 320, the method may also generate random samples drawn from the predictive distribution of attach rates. This can be facilitated by an appropriate choice of distribution at step 308. In an exemplary embodiment a multivariate distribution is used for the transformed attach rates. Let v and M be the location vector and dispersion matrix of this distribution, as estimated in steps 312 and 314. The procedure in one embodiment, shown in FIG. 5, generates a random realization of the predictive distribution of attach rates. At 502, compute the Cholesky decomposition of the matrix M as $M=LL^T$, using for example the algorithm, for instance, illustrated in Devroye, L. section XI.2.2 of *Non-uniform random variate generation*. Springer, 1986 ("Devroye"). At 504, generate a vector x, with the same number of elements as v, of independent standard normal random variates, for example, using the algorithm also shown by Devroye. At 506, compute the vector c=Lx. This vector is a random realization of the multivariate normal distribution of transformed attach rates. At 508, convert the transformed attach rates in the vector c into attach rates, using the reverse transformations described with reference to step 318 in FIG. 3.

Forecasts may be desirable for multiple future time intervals. For example, forecasts of the attach rates may be requested in every month for the next 12 months. This can be achieved using a straightforward extension of the procedure described above. Assume without loss of generality that forecasts are requested for disjoint time intervals. Forecasts for overlapping time intervals can be subsequently computed by convolution of the predictive distributions for disjoint intervals. In step 308 of FIG. 3, the multivariate distribution now represents the distribution of transformed attach rates over different time intervals. Therefore, in step 310 of FIG. 3, additional categories of dependence are considered, for example: (f) between the same option at the same node of the hierarchy over different time intervals; (g) between the same option at different nodes of the hierarchy over different time intervals; (h) between options in the same class at a single node of the hierarchy over different time intervals; (i) between options in different classes at a single node of the hierarchy over different time intervals; (j) between options in the same class at different nodes of the hierarchy over different time intervals; (k) between options from different classes at different nodes of the hierarchy over different time intervals.

An exemplary embodiment of the method of the present disclosure models these dependencies as follows. An exemplary embodiment specifies the structure of the dispersion matrix by applying the following assertions, which are based on general experience with hierarchically structured option data: Dependencies in class (f) can be large, and tend to vary. They can be modeled by setting the relevant dispersion matrix elements to $\rho^j$ where j is the time difference (as an integral number of time units) between the pair of attach rates and $\rho$ is a fixed value, which for convenience is taken to be the same for all attach rates, that is to be estimated by the procedure described in step 312 of FIG. 3; dependencies in categories (g), (h), (i), (j), and (k) tend to be small, and can be set to zero to a good approximation.

A system of the present disclosure may include means for performing the functions illustrated above. The means may include a computer processor or like, known or will be known. The means for performing the above-illustrated functions may also be embodied as software, firmware, hardware, article of manufacture or like.

The system and method of the present disclosure may be implemented and run on a general-purpose computer or computer system. The computer system may be any type of known or will be known systems and may typically include a processor, memory device, a storage device, input/output devices, internal buses, and/or a communications interface for communicating with other computer systems in conjunction with communication hardware and software, etc.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

I claim:

1. A computer-implemented method for forecasting demand for order configurations, comprising:
   receiving, using a processor, data associated with one or more products and said order configurations;
   defining a set of subproducts arranged in a hierarchy wherein each level of the hierarchy includes one or more option classes and wherein each of said classes includes one or more options represented as a set of nodes;
   expressing attach rates associated with n options as a set of n positive numbers whose sum is one, an attach rate representing a proportion of a product for which an option is requested;
   transforming said attach rates as a random vector in n−1 dimensional Euclidean space;
   modeling a distribution of the transformed attach rates as a distribution family specified by a location vector and a dispersion matrix of forecast errors, and reducing number of nonzero elements of the dispersion matrix by identifying categories of dependence (a) between options in the same class at a single node of a hierarchy, (b) between options in different classes at a single node of the hierarchy, (c) between the same option at different nodes of the hierarchy, (d) between options in the same class at different nodes of the hierarchy, (e) between options from different classes at different nodes of the hierarchy, wherein the hierarchy represents the product and classes of options as nodes in a hierarchical representation wherein selected dispersion matrix elements for pairs of nodes in a category are constrained to be equal, and wherein if two option classes are determined to be independent, the dispersion matrix has entries that reflect independence between every pair of transformed attach rates that contains one member from each of the two option classes, and wherein the dispersion matrix elements for pairs of nodes that are reflected as independent are constrained to be zero;
   estimating a location vector of the distribution by computing point forecasts of the transformed attach rates;
   estimating, by the processor, a dispersion matrix of the distribution, the dispersion matrix describing variability of the forecast errors of the transformed attach rates; and
   transforming said location vector and said dispersion matrix to forecast attach rates.

2. The computer-implemented method of claim 1, wherein the step of expressing attach rates is based on historical data or expert knowledge or combination of both, of said attach rates over a predetermined time interval.

3. The computer-implemented method of claim 1, wherein the step of modeling includes:
   selecting a distribution to be used for modeling.

4. The computer-implemented method of claim 1, wherein said distribution is a multivariate normal distribution.

5. The computer-implemented method of claim 1, further including using historical data or expert knowledge or combination of both to identify option families that have dependent demand.

6. The computer-implemented method of claim 1, wherein the step of estimating a dispersion matrix includes:
   estimating a plurality of parameters of the dispersion matrix based on historical data and dispersion of errors in historical point forecasts.

7. The computer-implemented method of claim 1, further including:
   storing said location vector and said dispersion matrix to forecast attach rates.

8. The computer-implemented method of claim 1, further including:
   displaying said forecast attach rates.

9. The computer-implemented method of claim 1, further including:
   generating random samples drawn from said forecast attach rates.

10. A system for forecasting demand for order configurations, comprising:
 a processor executing the steps of;
 receiving data associated with one or more products and said order configurations;
 defining a set of subproducts arranged in a hierarchy wherein each level of the hierarchy includes one or more option classes and wherein each of said classes includes one or more options represented as a set of nodes;
 expressing attach rates associated with n options as a set of n positive numbers whose sum is one, an attach rate representing a proportion of a product for which an option is requested;
 transforming said attach rates as a random vector in n−1 dimensional Euclidean space;
 modeling a distribution of the transformed attach rates as a dispersion matrix of forecast errors, and reducing number of nonzero elements of the dispersion matrix by identifying categories of dependence (a) between options in the same class at a single node of a hierarchy, (b) between options in different classes at a single node of the hierarchy, (c) between the same option at different nodes of the hierarchy, (d) between options in the same class at different nodes of the hierarchy, (e) between options from different classes at different nodes of the hierarchy, wherein the hierarchy represents the product and classes of options as nodes in a hierarchical representation, wherein selected dispersion matrix elements for pairs of nodes in a category are constrained to be equal, and wherein if two option classes are determined to be independent, the dispersion matrix has entries that reflect independence between every pair of transformed attach rates that contains one member from each of the two option classes, and wherein the dispersion matrix elements for pairs of nodes that are reflected as independent are constrained to be zero;
 estimating a location vector of the distribution by computing point forecasts of the transformed attach rates;
 estimating a dispersion matrix of the distribution, the dispersion matrix describing variability of the forecast errors of the transformed attach rates;
 transforming said location vector and said dispersion matrix to forecast attach rates; and
 a memory device for storing said attach rates.

11. The system of claim 10, wherein the step of modeling models a distribution of the transformed attach rates as a distribution family specified by a location vector and the dispersion matrix.

12. The system of claim 10, wherein the modeling further uses historical data or expert knowledge or combination of both to identify option families that have dependent demand.

13. The system of claim 10, wherein the estimating a dispersion matrix includes estimates a plurality of parameters of the dispersion matrix based on historical data and dispersion of errors in historical point forecasts.

14. A computer readable medium tangibly embodying a program of instructions executable by the machine to perform a method for forecasting demand for order configurations, comprising:
 receiving data associated with one or more products and said order configurations;
 defining a set of subproducts arranged in a hierarchy wherein each level of the hierarchy includes one or more option classes and wherein each of said classes includes one or more options represented as a set of nodes;
 expressing attach rates associated with n options as a set of n positive numbers whose sum is one, an attach rate representing a proportion of a product for which an option is requested;
 transforming said attach rates as a random vector in n−1 dimensional Euclidean space;
 modeling a distribution of the transformed attach rates as a distribution family specified by a location vector and a dispersion matrix of forecast errors, and reducing number of nonzero elements of the dispersion matrix by identifying categories of dependence (a) between options in the same class at a single node of a hierarchy, (b) between options in different classes at a single node of the hierarchy, (c) between the same option at different nodes of the hierarchy, (d) between options in the same class at different nodes of the hierarchy, (e) between options from different classes at different nodes of the hierarchy, wherein the hierarchy represents the product and classes of options as nodes in a hierarchical representation, wherein selected dispersion matrix elements for pairs of nodes in a category are constrained to be equal, and wherein if two option classes are determined to be independent, the dispersion matrix has entries that reflect independence between every pair of transformed attach rates that contains one member from each of the two option classes, and wherein the dispersion matrix elements for pairs of nodes that are reflected as independent are constrained to be zero;
 estimating a location vector of the distribution by computing point forecasts of the transformed attach rates;
 estimating the dispersion matrix of the distribution, the dispersion matrix describing variability of the forecast errors of the transformed attach rates; and
 transforming said location vector and said dispersion matrix to forecast attach rates.

15. The computer readable medium of claim 14, further including using historical data or expert knowledge or combination of both to identify option families that have dependent demand.

16. The computer readable medium of claim 14, wherein the step of estimating a dispersion matrix includes:
 estimating a plurality of parameters of the dispersion matrix based on historical data and dispersion of errors in historical point forecasts.

* * * * *